US007448539B2

(12) United States Patent
Zucker

(10) Patent No.: US 7,448,539 B2
(45) Date of Patent: Nov. 11, 2008

(54) METHOD FOR MAINTAINING A CUSTOMER ACCOUNT

(75) Inventor: Nehemia Zucker, Encino, CA (US)

(73) Assignee: j2 Global Communications, Hollywood, CA (US)

( * ) Notice: Subject to any disclaimer, the term of this patent is extended or adjusted under 35 U.S.C. 154(b) by 225 days.

(21) Appl. No.: 11/040,589

(22) Filed: Jan. 21, 2005

(65) Prior Publication Data
US 2006/0167774 A1     Jul. 27, 2006

(51) Int. Cl.
*G06F 7/08* (2006.01)
(52) U.S. Cl. .................... 235/381; 235/379
(58) Field of Classification Search ............... 235/381, 235/375, 379; 705/70, 42
See application file for complete search history.

(56) References Cited

U.S. PATENT DOCUMENTS 5,689,550 A * 11/1997 Garson et al. ............. 379/88.18
5,742,667 A * 4/1998 Smith .................... 379/112.09
5,825,863 A * 10/1998 Walker ..................... 379/114.2
5,884,284 A * 3/1999 Peters et al. .................. 705/30
5,991,380 A * 11/1999 Bruno et al. ............ 379/114.15
6,115,458 A * 9/2000 Taskett .................... 379/114.2
6,185,545 B1 * 2/2001 Resnick et al. ................ 705/40
6,639,977 B1 * 10/2003 Swope et al. ........... 379/114.21
6,977,998 B2 * 12/2005 Brown et al. ........... 379/114.21
2002/0119767 A1 * 8/2002 Fieldhouse et al. .......... 455/406
2005/0061872 A1 * 3/2005 Paschini et al. ............. 235/380

* cited by examiner

*Primary Examiner*—Ahshik Kim
(74) *Attorney, Agent, or Firm*—Blakely, Sokoloff, Taylor & Zafman, LLP

(57) ABSTRACT

A customer is provided a telephone number to which a calling party incurs a charge to be connected. An account balance, which reflects funds deposited into the customer's account but not yet used by the customer, is increased in proportion to the incurred charge. Other embodiments are also described and claimed.

23 Claims, 6 Drawing Sheets

| Account 4 | | | |
|---|---|---|---|
| Date | Activity | Amount | Balance |
| 601 January 5 | Deposit From 310-555-6789  602 | +5.00 | 5.00 |
| 603 February 10 | Receive FAX | -0.30 | 4.70 |
| 604 March 15 | Send FAX | -2.20 | 2.50 |
| 605 April 20 | Deposit | +1.50 | 4.00 |
| 606 May 25 | Conference Call | -0.90 | 3.10 |

FIG. 6

METHOD FOR MAINTAINING A CUSTOMER ACCOUNT

BACKGROUND

An embodiment of the invention relates to funding customer accounts of an online merchant by means of calling one or more special telephone numbers. Other embodiments are also described.

Many different goods and services are provided by merchants that conduct business via the Internet. However, these goods and services are often (but not always) provided free of charge, and the merchants are supported by incidental revenues such as fees collected from advertisers whose advertisements are displayed to users of the free goods and services. These incidental revenues are often insufficient to support higher-value goods and enhanced services, yet a merchant may wish to offer these improved goods and services to improve its competitive position vis à vis other merchants. Thus, an Internet merchant faces the problem of obtaining revenue sufficient to defray his operating costs and to provide a reasonable profit or return on investment.

One source of revenue is receiving direct payments from the users of the goods and services. However, users are often reluctant to establish new business relationships with Internet merchants because of security concerns, i.e. users may not wish to disclose their true names, addresses, or credit card information for fear that they will be inundated with junk mail and unsolicited commercial e-mail ("UCE" or "spam"), or that they will become the victims of fraudulent credit card activity. Also, in some countries, consumers have not become accustomed to purchasing Internet services by credit card, and so an alternate payment means is desirable.

BRIEF DESCRIPTION OF THE DRAWINGS

Embodiments of the invention are illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

FIG. 6 depicts a possible sequence of transactions occurring in a single customer's account.

DETAILED DESCRIPTION

Figure 1:
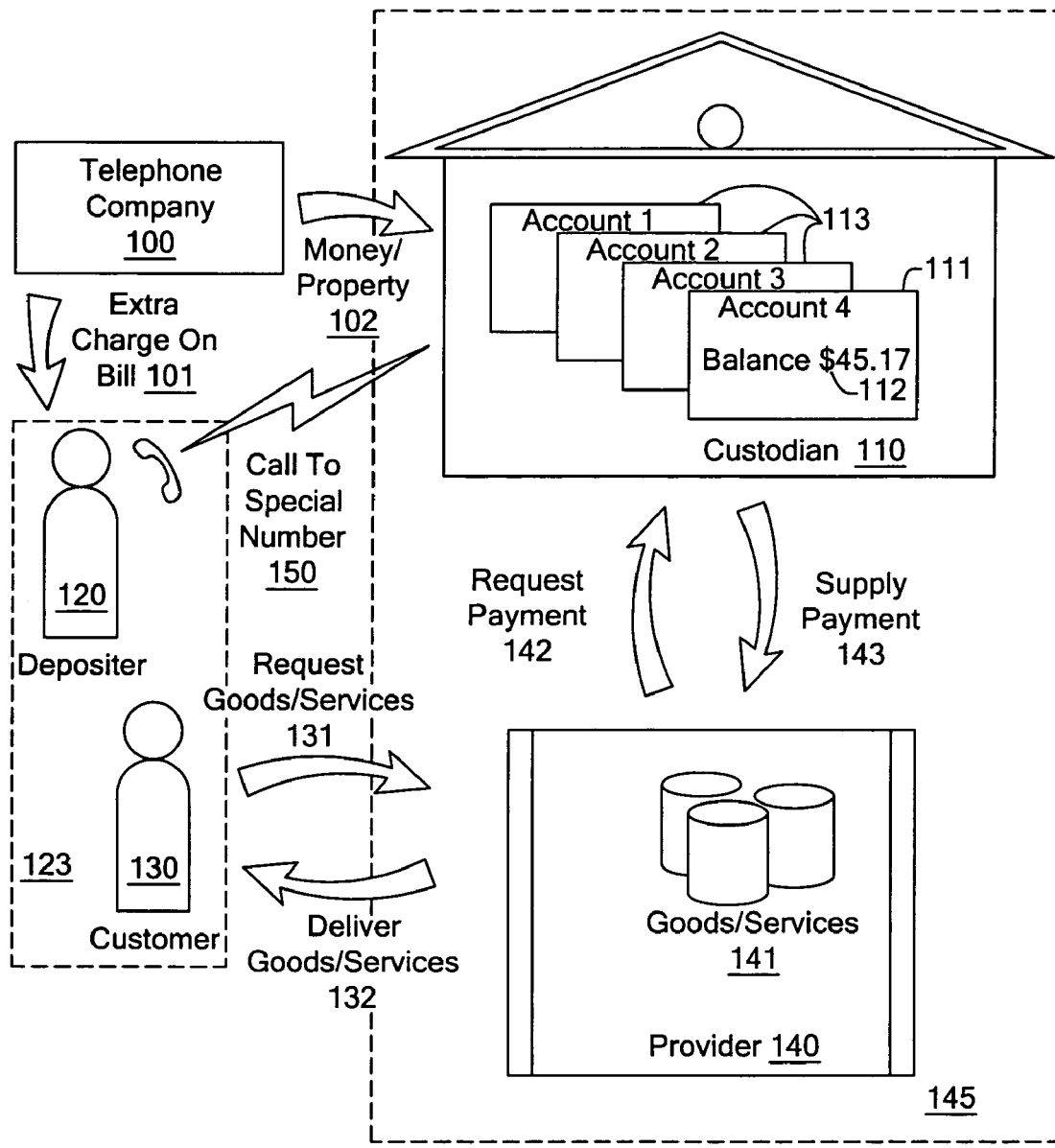
FIG. 1 is an overview diagram showing the participants in the system disclosed and their interactions.

The system disclosed facilitates financial transactions between a number of different participants. One possible combination of participants is illustrated in FIG. 1. The participants will be described in terms of the nature of their participation in the system. It will become clear that a single person or corporation may act in the role of several different participants. Roles that may often be combined are illustrated with dashed lines.

An element of this system is the customer account 111 which may be likened to a traditional savings account at a bank. The account stores at least one numerical value, which is called the account balance 112. The account balance may represent a monetary amount directly (e.g. dollars and cents); or the balance may represent "credits" or some other unit that is convenient for the users of the system. The stored account balance can be increased and decreased in response to certain events, as described below.

The customer account is maintained by a participant called the custodian 110. A custodian may maintain many customer accounts 113. The custodian is responsible for altering the account balance as necessary.

The customer account is maintained on behalf of a participant called the customer 130. The funds (dollars and cents, credits, or other units) stored in the account belong to and are held for the benefit of the customer.

The balance in the customer account is increased in response to deposits made by a participant called the depositor 120. In many cases, the depositor and the customer will be the same individual, as shown by dashed line 123, but this is not necessarily the case. For example, a depositor may make a deposit into the account of a customer other than himself in order to make a gift to that customer.

Deposits to the customer account are made through a procedure involving the custodian 110, the depositor 120, and a telephone company 100. The custodian obtains a special telephone number from its telephone company, where the special number has the characteristic that the custodian receives money or other tangible or intangible property 102 each time a calling party connects to the number. The calling party may be a person using a standard telephone, or it may be a computer or other device which has the ability to place a telephone call, either automatically or under the direction of a person. The special number may also have the property that callers who connect to the special number incur extra charges 101, over and above the normal fees they incur for the use of their telephone equipment and the telephone system. These additional charges are often billed to the depositor through his normal telephone company's service bill. An example of this sort of special telephone number is a "1-900" number, which is named after the dialing prefix commonly used. Another example of this sort of special telephone number is "CPP" (Calling Party Pays) numbers used for mobile telephone communications in certain markets. Another example is the sharing of termination fees, as applied in other markets. However, in some embodiments of the invention, the calling party or depositor need not incur additional charges. It is only necessary that the custodian receive money or other property when the number is called.

When the depositor places a call to the custodian's special number 150, the custodian increases the balance in at least one of the customer accounts it maintains. The custodian can identify the account(s) to be augmented by one or more of several means. For example, the custodian could establish a unique special number for each customer account. Therefore, the special number itself can identify the customer account. As another example, the custodian could determine the number from which the depositor is calling by any of a number of means known in the industry, and use the calling number (perhaps in conjunction with other information, such as the special number) to identify the customer account. As a further example, the custodian could provide the depositor with an access code, key, token, passcode, identification number, or other tangible or intangible thing, that the depositor can present to the custodian at the time of the call to the special number in order to identify the customer account.

Once the customer account is identified, the amount in that account is increased in response to the call to the special number. The amount of the increase may be proportional to the amount of money or property received by the custodian as a result of the call to the special number, but this is not required. Furthermore, the depositor may be able to specify an arbitrary extra charge he is willing to incur by calling the special number, and the custodian may increase the account balance by an amount corresponding to the arbitrary extra charge. In this manner, a depositor can make an arbitrarily large deposit to the customer account.

Once funds have been deposited into the customer account, the customer can use them to purchase goods or services 141 from another participant in the system, the provider 140. In many cases, the account custodian is the same entity as the provider, as shown by dashed line 145, but that is not required by the design of the system. The customer requests the goods or services he desires 131, and transmits to the provider information that will enable the custodian to identify the customer's account. The provider sends the desired goods or performs the desired service 132, and notifies the account custodian that the customer account balance should be debited 142. It should be realized that the provider may wish to confirm that the customer account contains sufficient funds to pay for the goods or services, and such capability may be present in the system. After the goods or services have been provided, the custodian decreases the account balance and (if the custodian is a different entity than the provider) transmits money to the provider 143 to pay for the goods or services.

It should be noted that in most instances, a depositor is not required to reveal any personally identifiable information, such as name, address, social security number, credit card number, or the like, to the account custodian. Thus, the system addresses a depositor's concern that his personal information will be used to send junk mail or to process unauthorized charges. Furthermore, the depositor is never required to appear in any particular physical location in order to make a deposit. Thus, the system is more convenient than one that, for example, requires a user to make a cash payment at a bank or other location. Finally, the system allows a provider of goods and/or services to receive payment for the goods or services provided.

Figure 2:
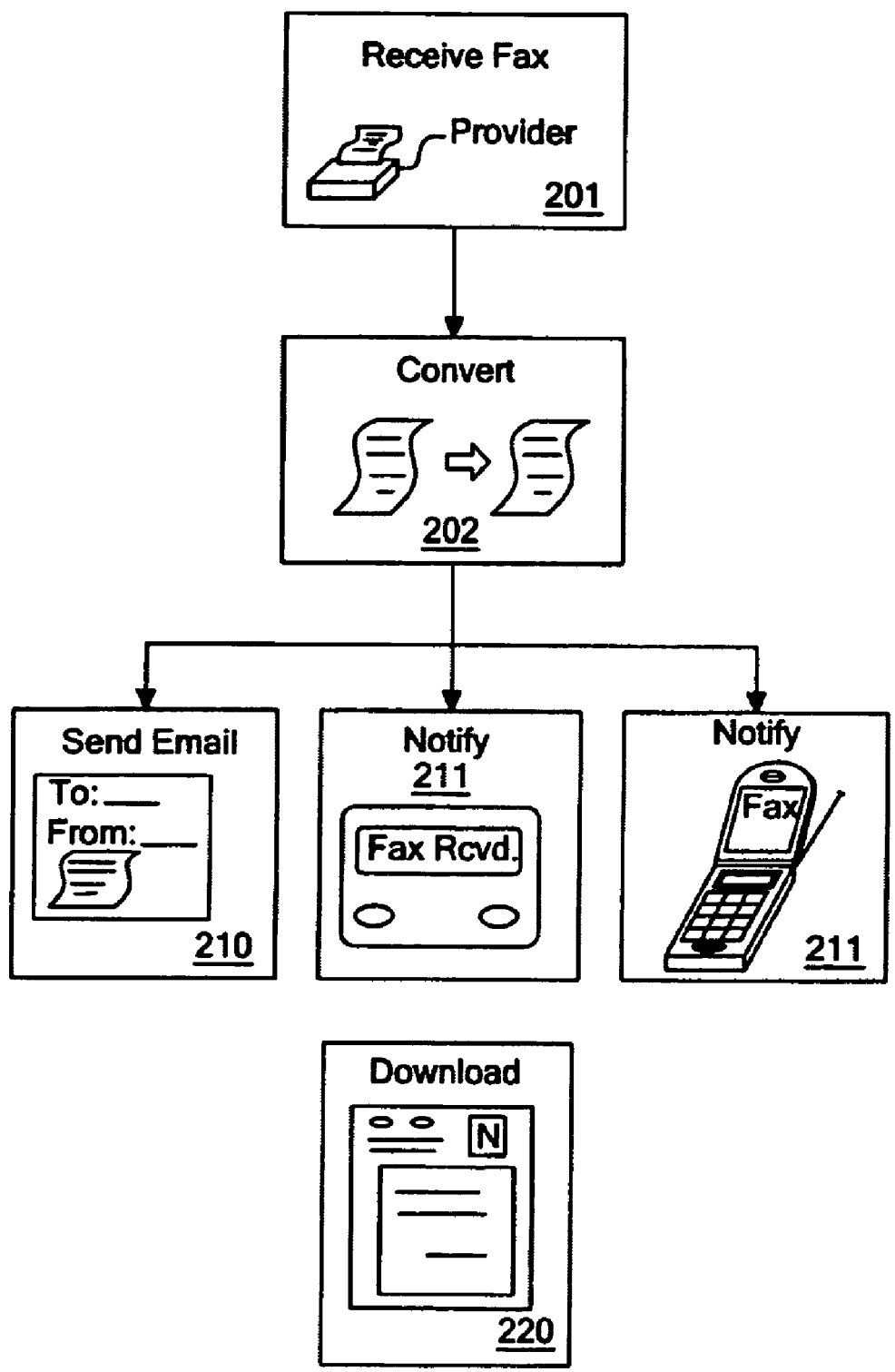
FIG. 2 shows a flow chart of the events involved in the provision of facsimile gateway services.

In one embodiment of the invention, the custodian and the service provider are the same entity (and will be referred to as the "merchant"), and the goods and/or services provided are telecommunications services. In particular, FIG. 2 shows the steps involved when facsimile gateway services are performed by a merchant, such as j2 Global Communications of Hollywood, Calif. Facsimile gateway services comprise: receiving facsimiles through the traditional telephone system 201 and converting the facsimile data to an electronic image format 202. The converted image may then be sent via electronic mail (email) to the customer, 210, or the customer may be notified through one or more of a pager, phone call, electronic mail, or other electronic messaging channel 211, that a facsimile has been received and can be viewed or downloaded from the merchant's system 220. The merchant then debits the customer's account for the reception, conversion and forwarding or notification service provided.

Figure 3:
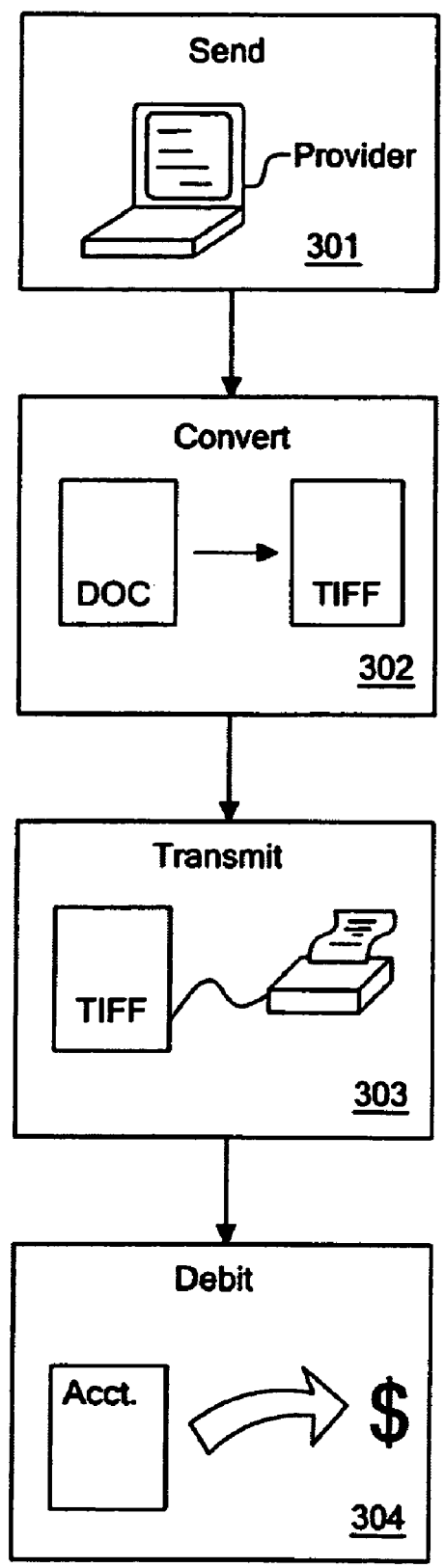
FIG. 3 shows a flow chart of the events involved in the provision of facsimile transmission services.

In addition, the merchant may offer facsimile transmission services, FIG. 3, where the customer sends a document to the merchant via electronic mail or other electronic means 301, the merchant converts it to data suitable for transmission via facsimile 302, and then the merchant sends it to one or more destination facsimile machines through the traditional telephone system 303. The customer's account is debited for the conversion and transmission services performed 304.

Figure 4:
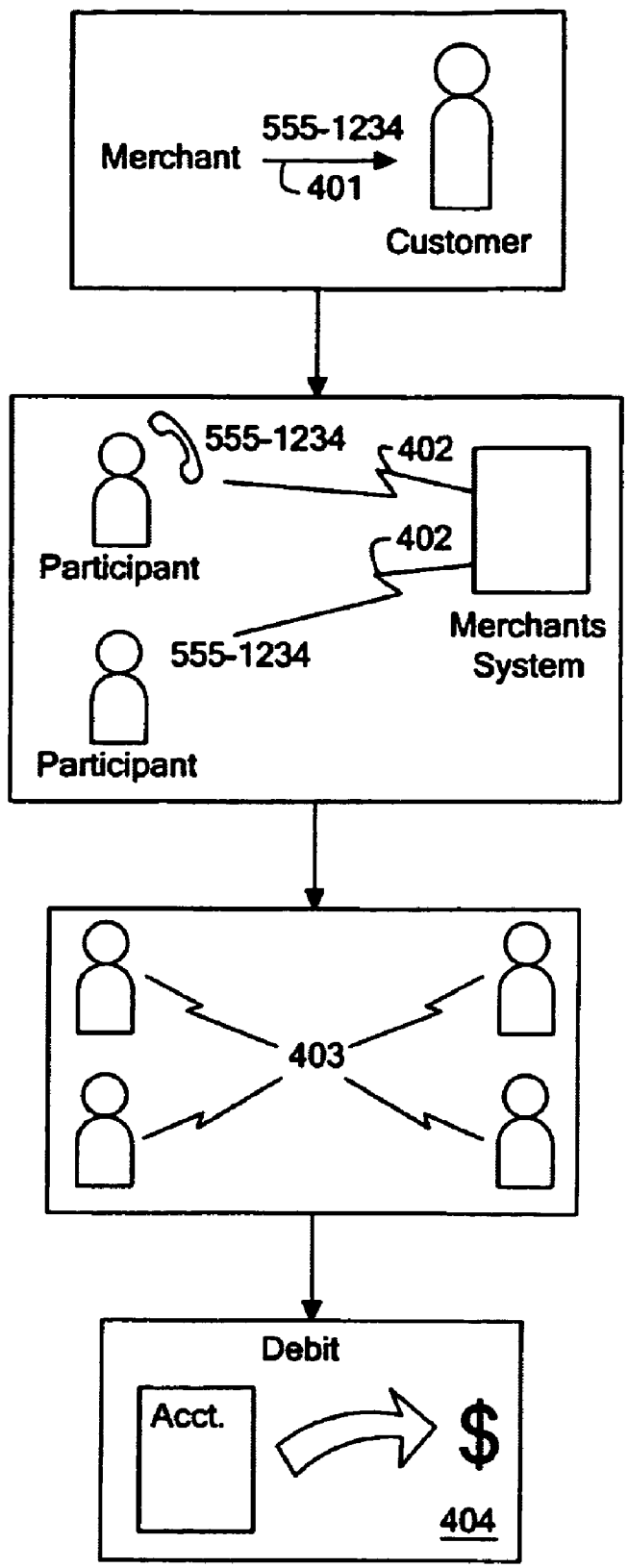
FIG. 4 shows a flow chart of the events involved in the provision of conference call management services.

The merchant may offer conference call management services, FIG. 4, wherein the customer can obtain a temporary phone number 401 that two or more parties can call 402, all parties then being connected to one another so that each can hear and speak to the others 403. The customer's account is debited for this service also 404.

Figure 5:
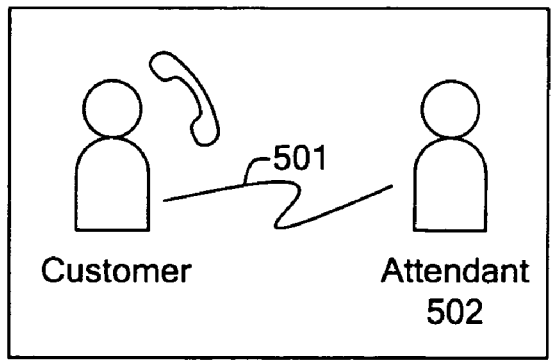
FIG. 5 shows a flow chart of the events involved in the provision of electronic-message-to-voice services.
Figure 5:
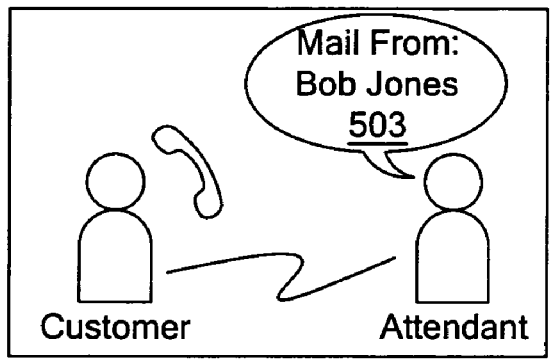
Figure 5:
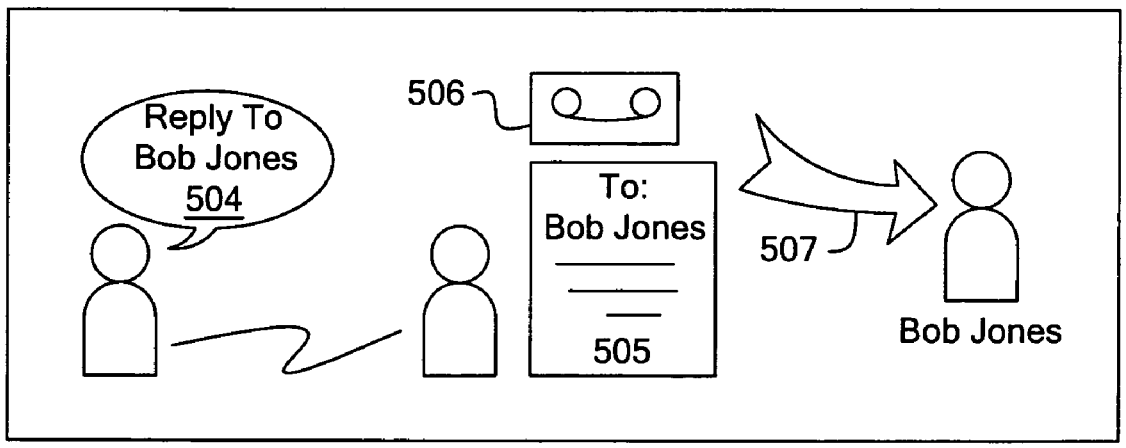

The merchant may also offer electronic message to voice services, as shown in FIG. 5. These services comprise calling a telephone number 501 and interacting with an attendant (possibly an automated attendant) 502 which will permit the customer to listen to electronic mail and other electronic-format messages as they are read by the attendant 503. The customer may also respond to these messages by recording a voice message 504 which can be transcribed by the attendant 505 or simply converted into an electronic sound recording 506; the response is then transmitted by an appropriate means 507.

FIG. 6 shows a possible sequence of transactions involving a customer account. In this example sequence, the account was established and funded on January 5 with a deposit of $5.00 (601). The deposit was made by a depositor calling a special "1-900" number from telephone number 310-555-6789 (602). Subsequently on February 10, a facsimile transmission was received and the account was debited $0.30 for the reception service provided (603). On March 15, the customer purchased facsimile transmission services from the provider and the account was debited $2.20 (604). On April 20, a depositor called the special number and the balance was increased by $1.50 (605). Finally, on May 25, the customer purchased conference-call setup services for $0.90 (606). This figure and example shows the type of deposit and withdrawal (or charging) activity that can be supported by the customer account.

An embodiment of the invention may be a machine-readable medium having stored thereon instructions which cause a processor to perform operations as described above. In other embodiments, the operations might be performed by specific hardware components that contain hardwired logic. Those operations might alternatively be performed by any combination of programmed computer components and custom hardware components.

A machine-readable medium may include any mechanism for storing or transmitting information in a form readable by a machine (e.g., a computer), not limited to Compact Disc Read-Only Memory (CD-ROMs), Read-Only Memory (ROMs), Random Access Memory (RAM), Erasable Programmable Read-Only Memory (EPROM), and a transmission over the Internet.

As mentioned previously, many online and Internet service providers have attracted users by providing certain services for free, and have defrayed the expenses of providing the services by, for example, collecting demographic or other information about the users, or by displaying advertisements to the users. Such service providers can employ an embodiment of the invention to increase revenue from these "free" users by obtaining a special telephone number with the properties described above and by communicating that number to some or all of their "free" users. The communication may be by way of direct electronic mail, by advertisement on the provider's or another's web site, or by traditional print, radio, or television advertising. A free user who is reached by one or more of these advertisements can become a paying user. He can thus obtain non-free ("premium") goods or services from the merchant, by calling the special telephone number to deposit funds into his customer account, to pay for such premium services.

References herein to "online merchants" and "merchants that conduct business via the Internet" are not limited to merchants who conduct business only via the Internet. For example, a retailer with both physical store locations and an online store may wish to implement the methodology described above for maintaining their customer accounts.

What is claimed is:

1. A method comprising:
   providing to a customer a telephone number to which a calling party incurs a charge to be connected;
   receiving a call to the provided number; and
   increasing an account balance, which reflects funds deposited into the customer's account but not yet utilized by the customer, by an amount that is less than or equal to the incurred charge.

2. The method of claim 1 wherein the funds can be used to purchase goods and/or services from the party maintaining the customer account.

3. The method of claim 1 wherein the funds can be used to purchase telecommunication services from the party maintaining the customer account.

4. The method of claim 3 wherein the telecommunication services comprise conference-call management services.

5. The method of claim 3 wherein the telecommunication services comprise fax-to-email gateway services.

6. The method of claim 1 further comprising receiving money or other property when the telephone number is called, wherein the account balance is increased proportional to the amount of money or property received from a telephone company as a result of the call.

7. The method of claim 3 wherein the telecommunication services comprise:
   providing to the customer a second telephone number that is assigned to a device that can receive facsimile transmissions; and
   receiving a facsimile transmission sent to the second telephone number.

8. The method of claim 7 further comprising:
   converting the facsimile transmission into a form suitable for transmission via electronic mail; and
   transmitting the converted facsimile transmission via electronic mail to an electronic mail address of the customer.

9. The method of claim 7 wherein the customer is notified by an electronic means that the facsimile transmission has been received.

10. The method of claim 3 wherein the telecommunication services comprise:
    receiving an electronic message from the customer;
    converting a portion of the electronic message into a form suitable for transmission via facsimile; and
    transmitting the converted portion of the electronic message to a device capable of receiving facsimile transmissions.

11. The method of claim 10 wherein the converted portion of the electronic message is transmitted to two or more devices capable of receiving facsimile transmissions.

12. A method comprising:
    establishing a debit account wherein a custodian holds funds for the benefit of a consumer, where said consumer can use said funds to pay for goods and/or services from a provider, and depositing funds into said debit account by means of a procedure that does not require a depositor to appear in person at any particular physical location and does not require the depositor to provide any personally-identifiable information to the custodian of the debit account; where the procedure for depositing funds comprises:
    the custodian providing a special telephone number to the depositor, said special telephone number having been previously arranged between the custodian and a telephone services provider such that callers to the special telephone number pay a charge to connect to the special telephone number and the custodian receives some portion of the charge; and
    the custodian increasing the funds available for use in the consumer's debit account in response to receiving a call made to the special telephone number by the depositor.

13. The method of claim 12 wherein the special telephone number is assigned to the debit account and not to any other debit account maintained by the custodian.

14. The method of claim 12 wherein the number of the telephone calling the special telephone number is determined through an automatic process and then used to identify the debit account to which the deposit is to be made.

15. The method of claim 12 wherein the depositor is provided an access code as well as the special telephone number, and the access code is used to identify the debit account to which the deposit is to be made.

16. The method of claim 12 wherein the depositor specifies an increased charge for the call to the special telephone number, and the custodian increases the funds available in the debit account by a larger amount than if the depositor had not specified the increased charge.

17. The method of claim 12 wherein the consumer is to use the funds in the debit account to purchase telecommunication services from said provider.

18. The method of claim 12 wherein the consumer is to use the funds in the debit account to purchase facsimile reception and e-mail gateway services from said provider.

19. A method comprising:
    obtaining a telephone number from a telephone company;
    transmitting the telephone number to a customer; and
    increasing an account balance in a customer account of the customer when a call to the telephone number is received wherein the telephone number has the property that the entity that obtained the telephone number receives money or property from the telephone company each time a call to the telephone number is connected.

20. The method of claim 19 wherein transmitting the telephone number to a customer comprises sending an electronic mail message containing the telephone number to the customer.

21. A computer-readable storage medium comprising instructions that, when executed by a computer, increase the funds available in a customer account (a) in response to an indication that a call has been made to a telephone number for which the caller is automatically charged an amount and (b) by an amount that is equal to or less than said charged amount; and
    decrease the funds available in the customer account in response to a service being provided to the customer.

22. The computer-readable storage medium of claim 21 further comprising instructions that treat the service provided to the customer as a communications service that converts an electronic message received from the customer into another format and transmits the formatted message to its intended recipient.

23. The computer-readable storage medium of claim 21 further comprising instructions that treat the telephone number as one that has a prefix that is common to all telephone numbers of the type for which a caller is automatically charged an amount.

* * * * *